(12) United States Patent
Nause

(10) Patent No.: US 8,414,240 B2
(45) Date of Patent: Apr. 9, 2013

(54) PUSH OVER ARM ASSEMBLY AND RETRO-FIT KIT FOR HAY BALE ACCUMULATORS

(76) Inventor: Greg Nause, Loveland, OH (US)

( * ) Notice: Subject to any disclaimer, the term of this patent is extended or adjusted under 35 U.S.C. 154(b) by 571 days.

(21) Appl. No.: 12/567,369

(22) Filed: Sep. 25, 2009

(65) Prior Publication Data
US 2010/0074716 A1   Mar. 25, 2010

Related U.S. Application Data

(60) Provisional application No. 61/119,191, filed on Dec. 2, 2008, provisional application No. 61/100,135, filed on Sep. 25, 2008.

(51) Int. Cl.
*A01D 87/12* (2006.01)
(52) U.S. Cl.
USPC .................... 414/111; 414/25; 414/800
(58) Field of Classification Search ............ 414/25, 414/111, 800; 56/474
See application file for complete search history.

(56) References Cited

U.S. PATENT DOCUMENTS

| | | | | |
|---|---|---|---|---|
| 4,310,275 A | * | 1/1982 | Hoelscher | 414/111 |
| 5,192,177 A | * | 3/1993 | Cardinal | 414/501 |
| 6,425,235 B1 | * | 7/2002 | Spaniol et al. | 56/474 |
| 7,246,479 B2 | * | 7/2007 | Spaniol et al. | 56/474 |
| 7,621,709 B2 | * | 11/2009 | Heitz, Jr. | 414/111 |

OTHER PUBLICATIONS

Operators Manual and parts book. Model 1000 Accumulator. Published by Hoelscher Inc. Part No. 01602 Ther is no publication date for this document. http://www.hoelscherinc.com/prod-acc.htm.*

* cited by examiner

*Primary Examiner* — Charles A Fox
(74) *Attorney, Agent, or Firm* — Wood, Herron & Evans, L.L.P.

(57) ABSTRACT

The invention is directed to a push over arm assembly and retro-fit kit for hay bale accumulators. In one embodiment, the push over arm kit includes a piston arm configured to be movably secured to a push over arm structure, such as that from a Hoelscher™ bale accumulator. An inclined plane is secured to a baler end of the piston arm and extends in a direction away from the piston arm forming an acute angle (Θ). And, a bias element, e.g., a spring, is configured to cooperate with the piston arm to bias the piston arm along its length. The spring controlled piston arm prevents or minimizes the occasional halting of a hay baling operation caused by jamming of the leading hay bale as it collides with a baler end of the piston arm.

18 Claims, 5 Drawing Sheets

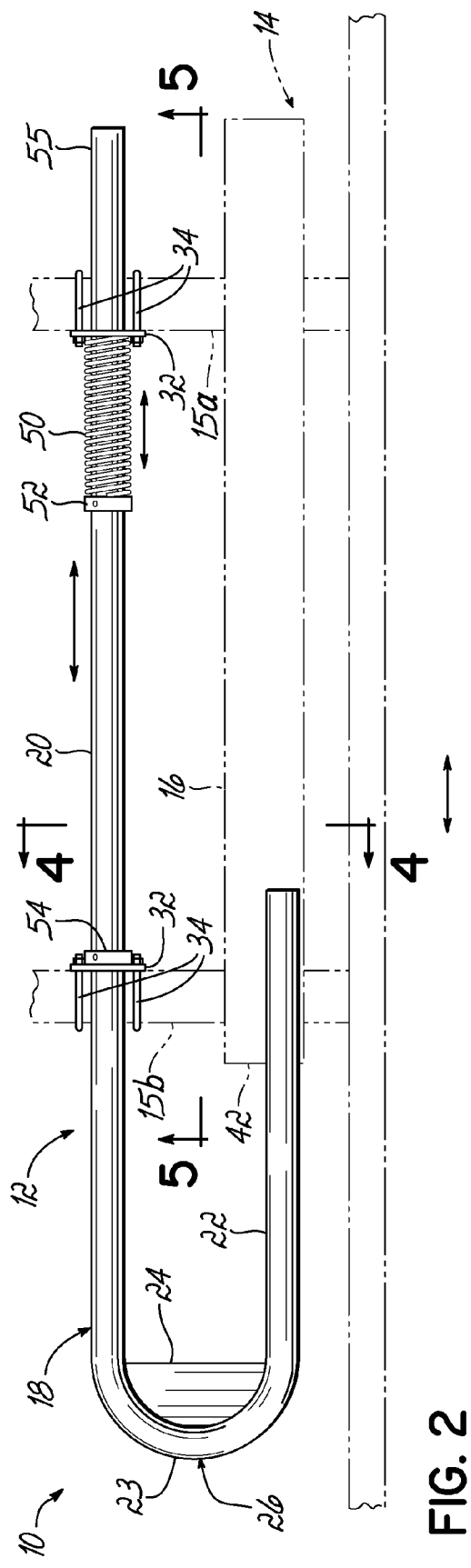
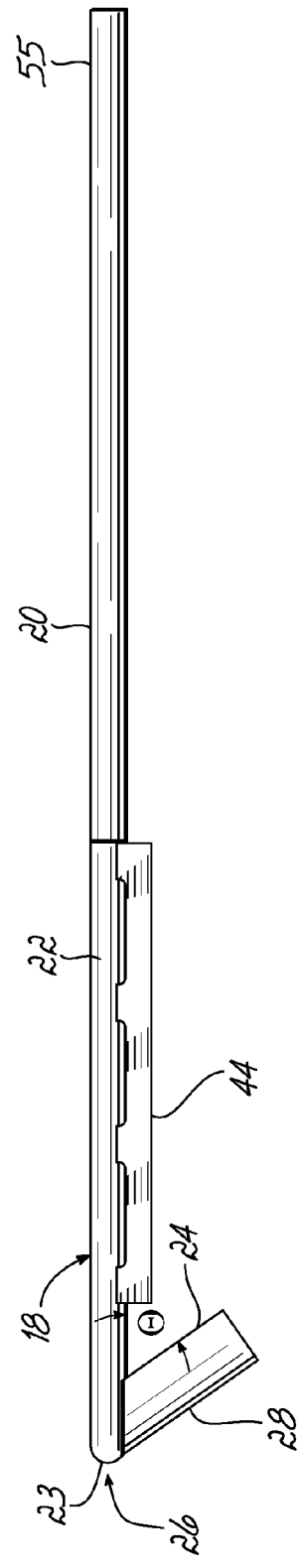
FIG. 2
FIG. 3

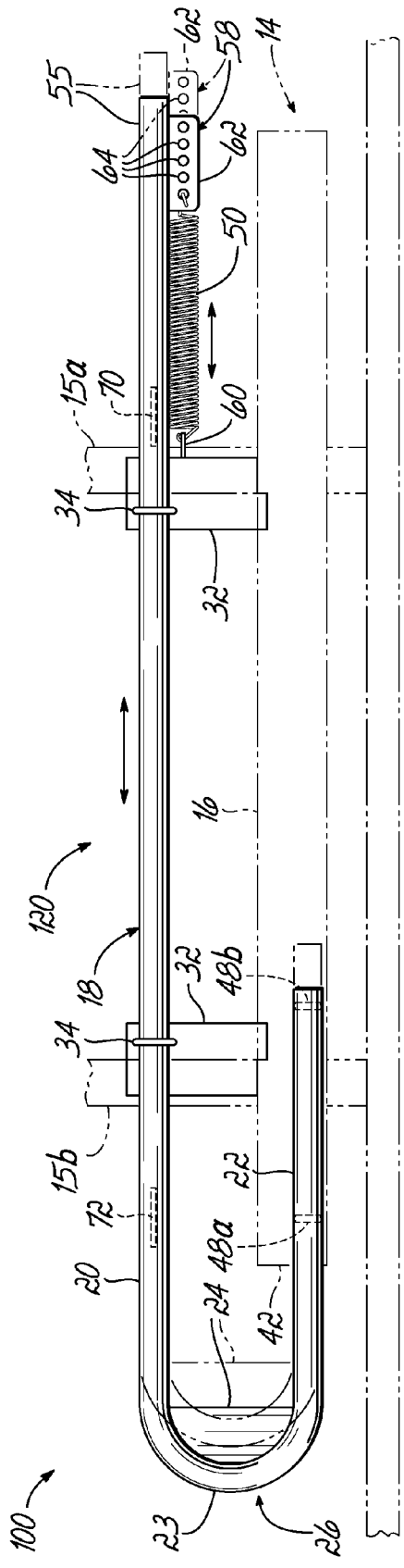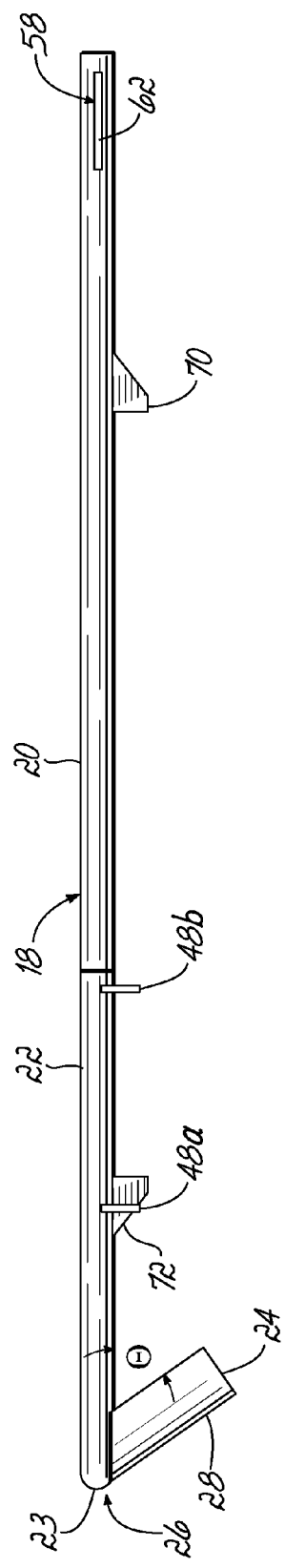
FIG. 6
FIG. 7

PUSH OVER ARM ASSEMBLY AND RETRO-FIT KIT FOR HAY BALE ACCUMULATORS

CROSS REFERENCE TO RELATED APPLICATIONS

This application claims the benefit of U.S. Provisional Application No. 61/100,135, filed Sep. 25, 2008, and U.S. Provisional Application No. 61/119,191, filed Dec. 2, 2008, the disclosures of which are hereby incorporated by reference herein in their entirety.

TECHNICAL FIELD

The present invention relates to hay bale accumulators and, more particularly, to a push over aim assembly and retro-fit kit for hay bale accumulators.

BACKGROUND

Towed behind a baler, a hay bale accumulator, such as a Hoelscher™ bale accumulator (e.g., the model 1000 accumulator), is powered by a tractor's hydraulic system. As the baler pushes hay bales onto the accumulator, a push over arm automatically activates to lift-up the accumulated hay bales by pivoting about 90° from a relatively horizontal to relatively vertical position so as to move the hay bales onto an adjacent bed. After lifting the hay bales, the push over arm returns to its original starting position to receive additional hay bales.

On occasion, as a result of mechanical timing issues that occur during inconsistent baling conditions, such as when tractor speeds and windrow sizes fluctuate, the leading, or horizontal traveling hay bale can collide head-on, as it exits the baler chute, with the front or baler end of the push over arm as it returns from the relatively vertical position to its original relatively horizontal starting position. Because the pushover arm is rigidly secured to the accumulator, this collision can jam the baler and destroy the leading hay bale, and ultimately bring the baling operation to a halt. Unfortunately, there is no mechanism built into existing accumulators to compensate for the collisions, or impact forces, between the hay bale and push over arm so as to prevent occasional halting of the baling operation. In addition, current push over arm designs are also known to cut bale strings and baling wire, which can lead to bale jamming and destruction.

It would thus be beneficial to provide an improved push over arm assembly and a retro-fit kit for hay bale accumulators that overcomes the aforementioned drawbacks.

SUMMARY

In one embodiment, a push over arm retro-fit kit for hay bale accumulators is provided wherein the kit includes a piston arm configured to be movably secured to a push over arm structure of a hay bale accumulator. The piston arm includes an inclined plane secured to a baler end of the piston arm. The inclined plane extends in a direction away from the piston arm and forms an acute angle ($\Theta$). The kit further includes a bias element that is configured to cooperate with the piston arm to bias the piston arm in a lengthwise direction. The retro-fit kit prevents or minimizes halting of a hay baling operation when a leading hay bale collides with the inclined plane of the piston arm upon return of the piston arm from a generally vertical position to a generally horizontal starting position.

In another embodiment, push over arm assembly of a hay bale accumulator is provided wherein the assembly includes a piston arm movably secured to framework of the hay bale accumulator. The piston arm includes an inclined plane secured to a baler end of the piston arm. The inclined plane extends in a direction away from the piston arm and forms an acute angle ($\Theta$). The assembly further includes a bias element that cooperates with the piston arm to bias the piston arm in a lengthwise direction. The push over aim assembly prevents or minimizes halting of a hay baling operation when a leading hay bale collides with the inclined plane of the piston arm upon return of the piston arm from a generally vertical position to a generally horizontal starting position.

In yet another embodiment, a method for preventing or minimizing jamming of a leading hay bale as the hay bale exits a baler and moves onto a hay bale accumulator is provided. The method includes biasing a baler end of a push over arm assembly of the hay bale accumulator for movement in a lengthwise direction. The baler end includes an inclined plane extending in a direction away from the baler end and forming an acute angle ($\Theta$). The inclined plane includes an outer face that confronts the leading bale of hay exiting from the baler such that the baler end retracts in the lengthwise direction upon collision of the leading bale of hay with the baler end.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 2 is a top plan view of the push over arm retro fit kit of FIG. 1;

FIG. 3 is a side elevational view of the push over arm retro fit kit of FIG. 1;

FIG. 6 is a top plan view of another embodiment of a push over arm retro fit kit for use in a push over arm assembly of a hay bale accumulator;

FIG. 7 is a side elevational view of the push over arm retro fit kit of FIG. 6;

DETAILED DESCRIPTION OF SPECIFIC EMBODIMENTS

Figure 1:
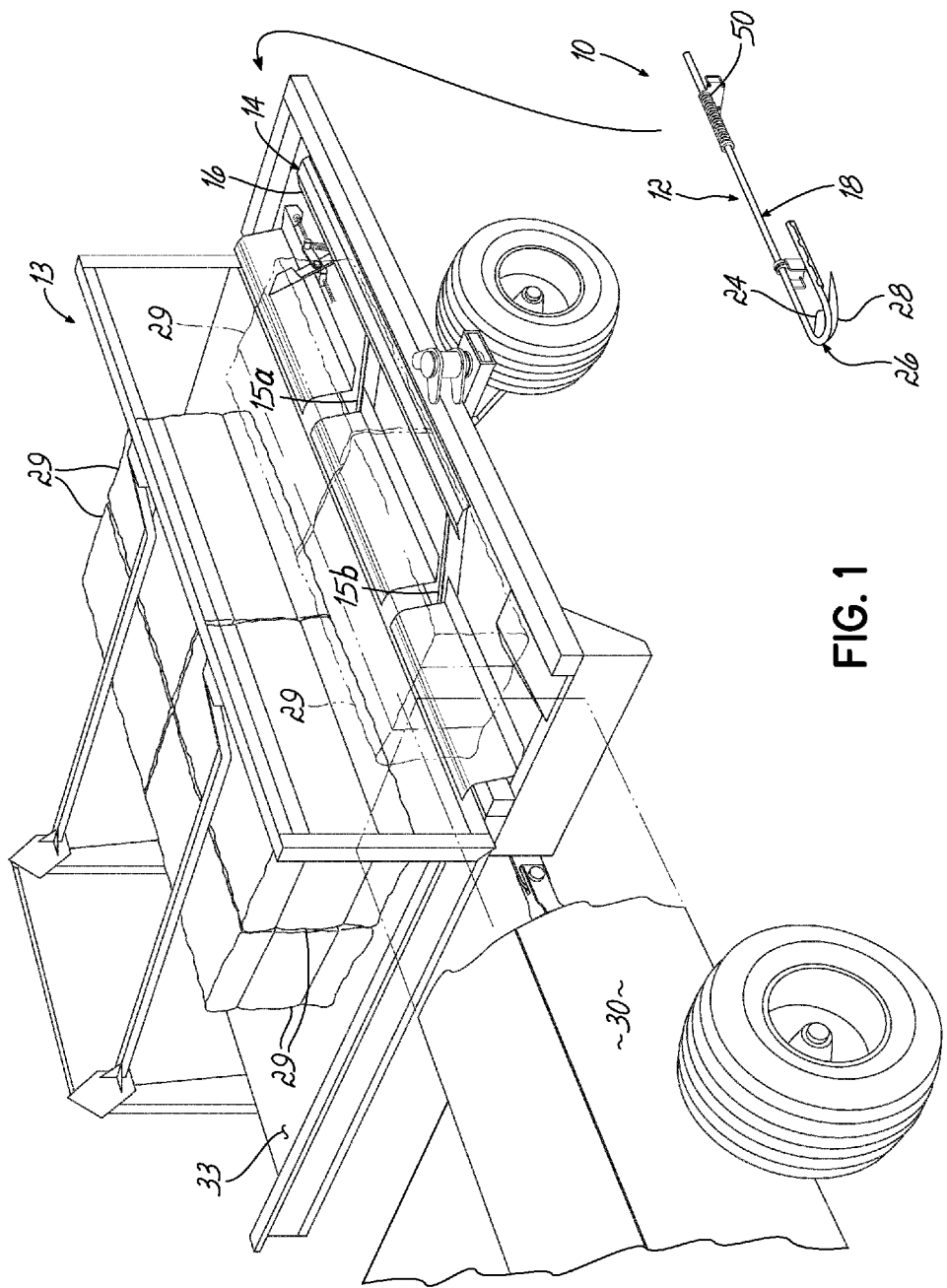
FIG. 1 is a perspective view of a hay bale accumulator including a push over arm assembly with a push over aim retro fit kit in accordance with an embodiment of the invention.

FIGS. 1-9 depict embodiments of a push over arm assembly 10, 100 and retro-fit kit 12, 120, or add-on, for hay bale accumulators 13.

With specific reference now to FIGS. 1-5, push over arm assembly 10 can be assembled utilizing the retro fit kit 12 and an existing push over arm structure 14, such as that from a Hoelscher™ bale accumulator (e.g., a model 1000 accumulator). The push over arm structure 14 defines an existing framework of the hay bale accumulator 13 illustrated generally as first and second spaced-apart parallel crossbars 15a and 15b and a lengthwise rail section 16 that is perpendicular and attaches to each of the crossbars. However, it should be understood that the existing push over arm structure 14 may be of various shapes and designs.

As best shown in FIG. 2-5, the push over arm retro-fit kit 12 includes a piston arm 18, or push-arm pipe, that can replace an existing push over arm structure (not shown) and that attaches to the existing push over arm structure 14 of the hay bale accumulator 13. The piston arm 18 is generally cane-shaped and includes a long portion 20 and a short portion 22 connected via a curved portion 23. While depicted as being generally cane-shaped, it should be understood that the piston arm 18 can include other various shapes and designs as needed or desired. The first and second parallel crossbars 15a, 15b in conjunction with the perpendicular rail section 16 of the existing frame structure 14 and the piston arm 18 are configured to receive hay bales 29 (FIG. 1) from a baler 30 (FIG. 1) and pivotally transport them to a bed 33 (FIG. 1) of the hay bale accumulator 13.

The push over arm retro-fit kit 12 further includes a beveled or inclined plane 24 that is secured, e.g., fixedly secured, such as via welding, to a baler end 26 of the piston arm 18. The inclined plane 24 extends in a direction away from the piston arm and forms an acute angle ($\Theta$), i.e., an angle that is less than 90° and greater than 0°. In one example, the angle is between 5° and 85°. In another example, the angle is between 20° and 70° in yet another example, the angle is about 45°. When the hay bale accumulator 13 is in use, an outer face 28 of the inclined plane 24 confronts a leading bale of hay 29 (FIGS. 1 and 9) exiting from the baler 30 (FIG. 1) as the push over arm assembly 10 returns from a relatively vertical position to a relatively horizontal starting position, as explained above in the technical background.

With continuing reference to FIGS. 2-5, the kit 12 further includes fasteners defining mounting brackets 32 and corresponding U-bolts 34, which secure the long portion 20 of the piston arm 18 to the first and second parallel crossbars 15a, 15b of the push over arm 14 so that the long portion 20 of the piston arm 18 is movably secured thereacross. Each mounting bracket 32 includes an extension 39 having an opening therethrough for receiving the long portion 20 of the piston arm 18 when mounted. The U-bolts 34, with corresponding fasteners, e.g., nuts, are used to secure each mounting bracket 32 to the existing first and second parallel crossbars 15a, 15b as shown. It should be understood that other known means and methods for movably securing the piston arm 18 to the existing frame structure 14 may be utilized.

Figure 4:
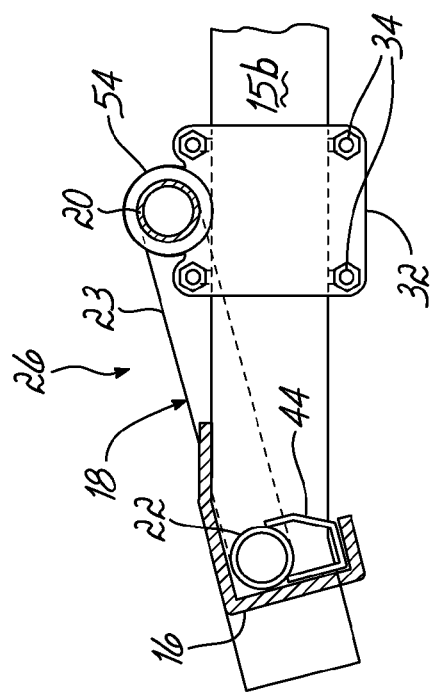
FIG. 4 is a cross-sectional view of the push over arm retro-fit kit of FIG. 2 taken along lines 4-4.

The short portion 22 of the piston arm 18 similarly is movably received within an open end 42 of the perpendicular rail section 16 of the existing frame structure 14. To help guide and prevent or minimize excessive motion of the short portion 22 of the piston arm 18 during movement thereof within the open end 42, the short portion 22 can be configured to complement the shape of the inside of the open end 42. In one example, as best shown in FIG. 4, a bottom guide member 44 can be secured, such as via welding, to a length of the underside of the short potion 22 so as to limit the amount of movement, or play, of the short portion 22 when situated within the open end 42. Alternatively, as shown in FIG. 7, the bottom guide member 44 can be replaced by pipe rests 48a and 48b, which also are formed to support the short portion 22 within the open end 42. In particular, the pipe rests 48a, 48b can be secured, e.g., via welding, to the underside of the short portion 22 that is situated within the open end 42. In another embodiment, although not shown, the pipe rests 48a, 48b may be secured within the open end 42 whereat the short portion 22 can be positioned thereon to slide back and forth thereagainst.

Figure 5:
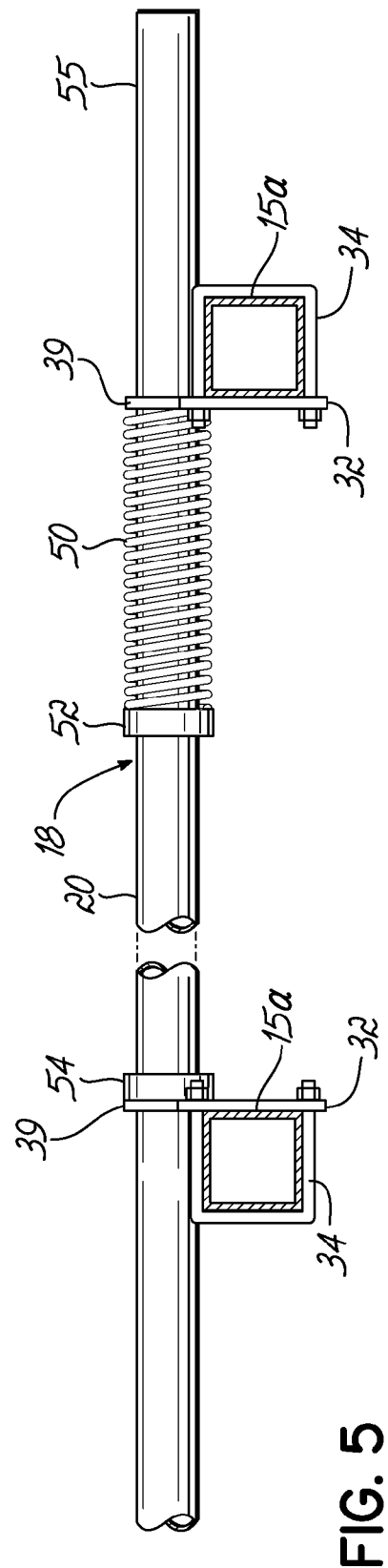
FIG. 5 is a cross-sectional view of the push over arm retro-fit kit of FIG. 2 taken along lines 5-5.

With further reference to FIGS. 2 and 5, the kit 12 also includes a bias element 50 and first and second stop members 52 and 54. While other bias elements are contemplated, e.g., a rubber band, cable, hydraulic system, and the like, the bias element 50 illustrated in this embodiment is a compression spring and the first and second stop members 52 and 54 are first and second set screw collars. While various types of springs are contemplated, the compression spring 50, in this example, defines an open coil helical spring that is proximately received about a terminal end 55 of the long portion 20. The compression spring 50 is securely positioned about the long portion 20 generally in a relaxed or neutral state between mounting bracket 32, which rests against first parallel crossbar 15a, and the first set screw collar 52, which is secured, via a set screw, to the long portion 20. This arrangement allows the piston arm 18 to be spring-controlled. In one example, the compression spring 50 allows for about 6 inches of movement of the piston arm 18 in a lengthwise direction when a hay bale 29 collides with the inclined plane 24. However, it should be understood that this distance may vary as needed or desired.

Figure 9:
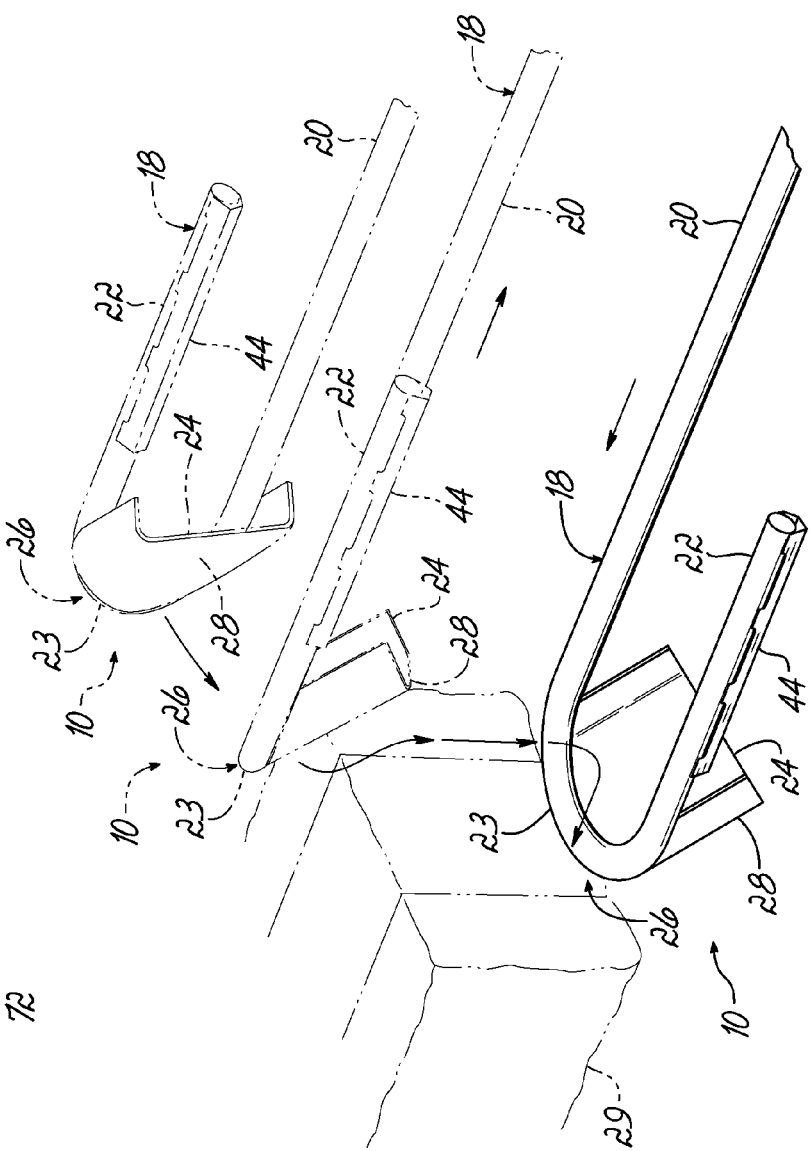
FIG. 9 is a partial perspective view of the anti-jamming movement of the push over arm assembly of FIG. 1.

With reference now to FIGS. 2 and 9, due to the spring-controlled piston arm 18 and inclined plane 24, when a leading bale of hay 29 exiting the baler 30 (FIG. 1) collides with the baler end 26 of the piston arm 18 of the push over arm assembly 10 as it moves from its relatively vertical position to its relatively horizontal starting position, it will retract the piston arm 18. Specifically, the force from the leading bale 29 will push the spring-controlled piston arm 18 to its desired retracted position by compressing the compression spring 50. And due to the inclined plane 24, the push over arm assembly 10 passes around, i.e., slides against, the leading bale 29. When the piston arm 18 finally clears the bottom of the leading bale 29, the compression spring 50 moves the piston arm 18 forward to its neutral or starting position. Thus, halting of the baling operation caused by jamming of the leading hay bale 29 as it collides with the piston arm 18 upon return thereof from a relatively vertical position to a relatively horizontal starting position is prevented or minimized.

To restrain or control movement of the piston arm 18 when the compression spring 50 pushes back to its neutral or starting position, the second set screw collar 54 is secured, via a set screw, to the long portion 20 adjacent the mounting bracket 32 that rests against the second parallel crossbar 15b so that second set screw collar 54 faces first set screw collar 52. In an alternate embodiment, although not shown, the second set screw collar 54 may be secured, via a set screw, to the long portion 20 adjacent the first parallel crossbar 15a on an opposing side of and away from the compression spring 50.

Figure 8:
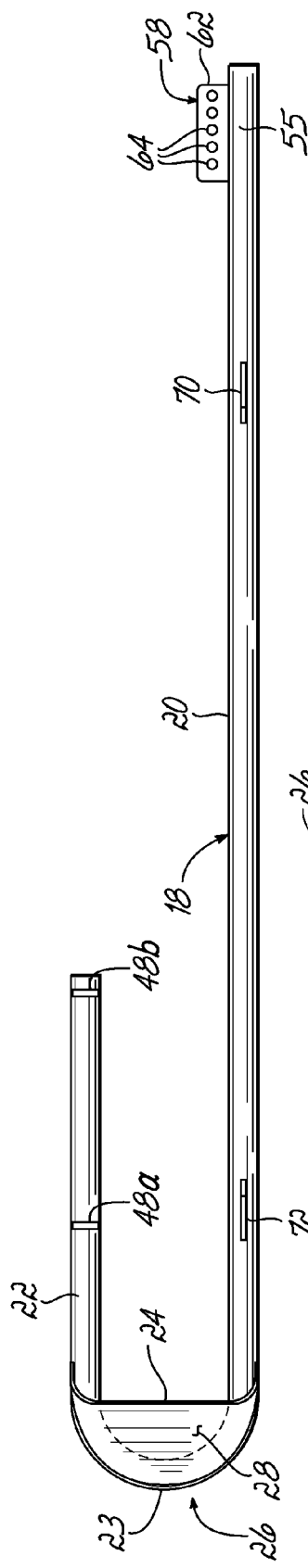
FIG. 8 is a bottom plan view of the push over arm retro fit kit of FIG. 6.

With specific reference now to FIGS. 6-8, push over arm assembly 100 for hay bale accumulators 13 (FIG. 1), in accordance with another embodiment of the present invention, is shown. Similar reference numbers in FIGS. 6-8 will refer to like features shown in FIGS. 2-5. In this embodiment, push over arm retro-fit kit 120 includes piston arm 18, or push-arm pipe, that attaches to the existing push over arm structure 14 of the hay bale accumulator 13. The piston arm 18 is generally cane-shaped and includes long portion 20 and short portion 22 connected via curved portion 23, and beveled or inclined plane 24 is secured, e.g., fixedly secured, such as via welding, to the baler end 26 of the piston arm 18. Again, while depicted as being generally cane-shaped, it should be understood that the piston arm 18 can include other various shapes and designs. The inclined plane 24 extends in a direction away from the piston arm and forms an acute angle (Θ). In one example, the angle is between 5° and 85°. In another example, the angle is between 20° and 70°. In yet another example, the angle is about 45°.

The first and second parallel crossbars 15a, 15b in conjunction with the existing lengthwise rail section 16 and the piston arm 18 are configured to receive hay bales 29 (FIG. 1) from the baler 30 (FIG. 1) and pivotally transport them to the bed 33 (FIG. 1) of the hay bale accumulator 13. And when the hay bale accumulator 13 is in use, outer face 28 of the inclined plane 24 confronts a leading bale of hay 29 (FIG. 1) exiting from baler 30 (FIG. 1) as the push over arm assembly 100 returns from a relatively vertical position to a relatively horizontal starting position, like that depicted with push over arm assembly 10 in FIG. 9.

As best shown in FIG. 6, the kit 120 further includes two mounting brackets 32 and corresponding U-bolts 34. Each of the mounting brackets 32 are secured, e.g., via welding, to the first and second parallel crossbars 15a, 15b, respectively. And corresponding U-bolts 34 are placed over the long portion 20 and fastened to its respective mounting bracket 32 to movably secure the long portion 20 of the piston arm 18 across the first and second parallel crossbars 15a, 15b. It should be understood that other known means and methods for movably securing the piston arm 18 to the existing frame structure 14 may be utilized.

The short portion 22 of the piston arm 18 is movably received within an open end 42 of the perpendicular rail section 16 of the existing frame structure 14. To help guide and prevent or minimize excessive motion of the short portion 22 of the piston arm 18 during movement thereof within the open end 42, the kit 120 can further include pipe rests 48a, 48b formed so as to support the short portion 22. In particular, the pipe rests 48a, 48b are secured, e.g., via welding, to the underside of the short portion 22 which is situated within the open end 42. Alternatively, the pipe rests 48a, 48b may be secured within the open end 42 such that the short portion 22 is positioned thereon to slide back and forth thereagainst. The pipe rests 48a, 48b also may be replaced by bottom guide member 44 as shown in FIG. 3.

With further reference to FIGS. 6 and 8, the kit 120 also includes bias element 150 and first and second bias element attachments 58 and 60. While other bias elements are contemplated, e.g., a rubber band, cable, hydraulic system, and the like, the bias element 150 illustrated in this embodiment is an extension spring. The first bias element attachment 58 is secured proximate terminal end 55 of the long portion 20 of the piston arm 18, such as via welding, and defines a plate 62 having a plurality of holes 64 therethrough to removably receive a hooked end of the spring 150. The tension of the spring may be adjusted according to the corresponding hole 64 through which the hooked end of the spring 150 is received. It is contemplated that a single hole 64 in the first bias element attachment 58 will suffice. The second bias element attachment 60 is secured to the first parallel crossbar 15a, such as via welding, and also defines a plate 66 having a hole (not shown) therethrough for securely receiving the opposing hooked end of the spring 150. As best shown in FIG. 6, each hooked end of the spring 150 is secured to its corresponding bias element attachment 58, 60 so that the piston arm 18 can be mechanically spring-loaded.

As best shown in FIG. 6-8, to restrain or control movement of the piston arm 18, first and second stops 70 and 72, which define protrusions, may be provided spaced apart on the underside of the long portion 20 of the piston arm 18. In particular, each stop 70, 72 is securely positioned on the piston arm 18, such as via welding, so as to reside on the outside of a corresponding one of the two parallel crossbars 15, 15b. When the spring 150 is in a neutral or relaxed state, the first stop 70 can contact the first parallel crossbar 15a. And, when the spring 150 is in a stretched or expanded state, such as when hay bale 29 collides with the inclined plane 24, the second stop 72 can contact the second parallel crossbar 15b. In one example, the stops 70, 72 are spaced so as allow for about 6 inches of movement of the piston arm 18 in a lengthwise direction when hay bale 29 collides with the inclined plane 24. However, it should be understood that this distance may vary as needed or desired With reference now to FIGS. 6 and 9, due to the spring-controlled piston arm 18 and inclined plane 24, when leading bale 29 exiting baler 30 (FIG. 1) collides with the baler end 26 of the piston arm 18 of push over arm assembly 100 as it moves from a relatively vertical position to a relatively horizontal starting position, it will compress or retract the piston arm 18, like that depicted in FIG. 9 with push over arm assembly 10. Specifically, the mechanical force from the leading bale 29 will elongate or expand the spring 150 and, thus, push the spring-controlled piston arm 18 to its desired retracted position. And due to the inclined plane 24 and the spring 150, the push over arm assembly 100 passes around, i.e., the inclined plane slides against, the leading bale 29. When the piston arm 18 finally clears the bottom of the leading bale 29, the spring 150 moves the piston arm 18 forward to its neutral or starting position. And thus, halting of the baling operation caused by jamming of the leading hay bales 29 as it collides with the piston arm 18 upon return thereof from a relatively vertical position to a relatively horizontal starting position is prevented or minimized.

Accordingly, embodiments of the push over arm assembly 10, 100 and retro-fit kit 12, 120 for hay bale accumulators 13 are provided which can drastically improve the mechanical performance and speed of current hay accumulators 13, such as the Hoelscher™ bale accumulator (e.g., the model 1000 accumulator).

While the present invention has been illustrated by a description of various embodiments and while these embodiments have been described in, considerable detail, it is not the intention of the applicant to restrict or in any way limit the scope of the appended claims to such detail. For example, while the push over arm retro fit kit 12, 120 has been generally described herein as an aftermarket kit, it should be understood that the components thereof simply may be incorporated into the initial build of the hay bale accumulator 13 and be part of the originally manufactured push over arm assembly 10, 100. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A push over arm retro-fit kit for hay bale accumulators comprising:
   a piston arm configured to be movably secured to a push over arm structure of a hay bale accumulator, the piston arm including an inclined plane secured to a baler end of the piston arm, the inclined plane extending in a direction away from the piston arm and forming an acute angle (Θ); and
   a bias element that is configured to cooperate with the piston arm to bias the piston arm in a lengthwise direction, wherein the retro-fit kit minimizes halting of a hay baling operation when a leading hay bale collides with the inclined plane of the piston arm upon return of the piston arm from a generally vertical position to a generally horizontal starting position.

2. The kit of claim 1 wherein the bias element defines a spring that is configured to cooperate with the piston arm so that the piston arm is mechanically spring-loaded.

3. The kit of claim 2 wherein the spring is a compression spring or an extension spring.

4. The kit of claim 1 wherein the piston arm includes a long portion and a short portion connected via a curved portion.

5. The kit of claim 4 wherein the piston arm is generally cane-shaped.

6. The kit of claim 1 further including fasteners that are configured to movably secure the piston arm to the push over arm structure of the hay bale accumulator.

7. The kit of claim 1 further including first and second stop members or first and second stops configured to limit movement of the piston arm in the lengthwise direction.

8. The kit of claim 1 further including a bottom guide member or at least one pipe rest configured to guide and prevent or minimize excessive motion of the piston arm during movement of the piston arm in the lengthwise direction.

9. A push over arm assembly of a hay bale accumulator comprising:
a piston arm movably secured to framework of the hay bale accumulator, the piston arm including an inclined plane secured to a baler end of the piston arm, the inclined plane extending in a direction away from the piston arm and forming an acute angle ($\Theta$); and
a bias element that cooperates with the piston arm to bias the piston arm in a lengthwise direction,
wherein the push over arm assembly minimizes halting of a hay baling operation when a leading hay bale collides with the inclined plane of the piston arm upon return of the piston arm from a generally vertical position to a generally horizontal starting position.

10. The assembly of claim 9 wherein the framework includes first and second spaced-apart parallel crossbars and a lengthwise rail section that is perpendicular and attaches to each of the crossbars, the piston arm movably secured to the first and second spaced-apart parallel crossbars and the lengthwise rail section.

11. The assembly of claim 9 wherein the bias element defines a spring that is configured to cooperate with the piston arm so that the piston arm is mechanically spring-loaded.

12. The assembly of claim 11 wherein the spring is a compression spring or an extension spring.

13. The assembly of claim 9 wherein the piston arm includes a long portion and a short portion connected via a curved portion.

14. The assembly of claim 13 wherein the piston arm is generally cane-shaped.

15. The assembly of claim 13 further including first and second stop members or first and second stops that are secured to the long portion of the piston arm and are configured to limit movement of the piston arm in the lengthwise direction.

16. The assembly of claim 13 further including a bottom guide member or at least one pipe rest that is secured to a length of the short portion of the piston arm and configured to guide and prevent or minimize excessive motion of the piston arm during movement of the piston arm in the lengthwise direction.

17. The assembly of claim 9 further including fasteners that cooperate with the framework and the piston arm to movably secure the piston arm to the framework of the hay bale accumulator.

18. A method for minimizing jamming of a leading hay bale as the hay bale exits a baler and moves onto a hay bale accumulator, the method comprising:
biasing a baler end of a push over arm assembly of the hay bale accumulator for movement in a lengthwise direction, the baler end including an inclined plane extending in a direction away from the baler end and forming an acute angle ($\Theta$), the inclined plane including an outer face that confronts the leading bale of hay exiting from the baler such that the baler end retracts in the lengthwise direction upon collision of the leading bale of hay with the baler end.

\* \* \* \* \*

UNITED STATES PATENT AND TRADEMARK OFFICE
CERTIFICATE OF CORRECTION

| | |
|---|---|
| PATENT NO. | : 8,414,240 B2 |
| APPLICATION NO. | : 12/567369 |
| DATED | : April 9, 2013 |
| INVENTOR(S) | : Greg Nause |

It is certified that error appears in the above-identified patent and that said Letters Patent is hereby corrected as shown below:

In the Specifications:

Column 1

Line 17, change "aim" to --arm--.

Column 2

Line 9, change "aim" to --arm--.

Line 35, change "aim" to --arm--.

Column 3

Line 29, change "70° in" to "70°. In".

Column 6

Line 40, delete the first occurrence of ",".

Signed and Sealed this
Sixteenth Day of July, 2013

Teresa Stanek Rea
*Acting Director of the United States Patent and Trademark Office*